Aug. 31, 1965          R. B. FULLER          3,203,144
                    LAMINAR GEODESIC DOME
Filed May 27, 1960                        14 Sheets-Sheet 1

INVENTOR.
RICHARD BUCKMINSTER FULLER
BY
*Robertson & Smythe*
ATTORNEYS.

INVENTOR.
RICHARD BUCKMINSTER FULLER
BY
*Robertson & Smythe*
ATTORNEYS.

INVENTOR.
RICHARD BUCKMINSTER FULLER
BY
ATTORNEYS.

Aug. 31, 1965 R. B. FULLER 3,203,144
LAMINAR GEODESIC DOME
Filed May 27, 1960 14 Sheets-Sheet 4

INVENTOR.
RICHARD BUCKMINSTER FULLER
BY
ATTORNEYS.

Aug. 31, 1965  R. B. FULLER  3,203,144
LAMINAR GEODESIC DOME

Filed May 27, 1960  14 Sheets-Sheet 6

INVENTOR.
RICHARD BUCKMINSTER FULLER
BY
*Robertson & Smythe*
ATTORNEYS.

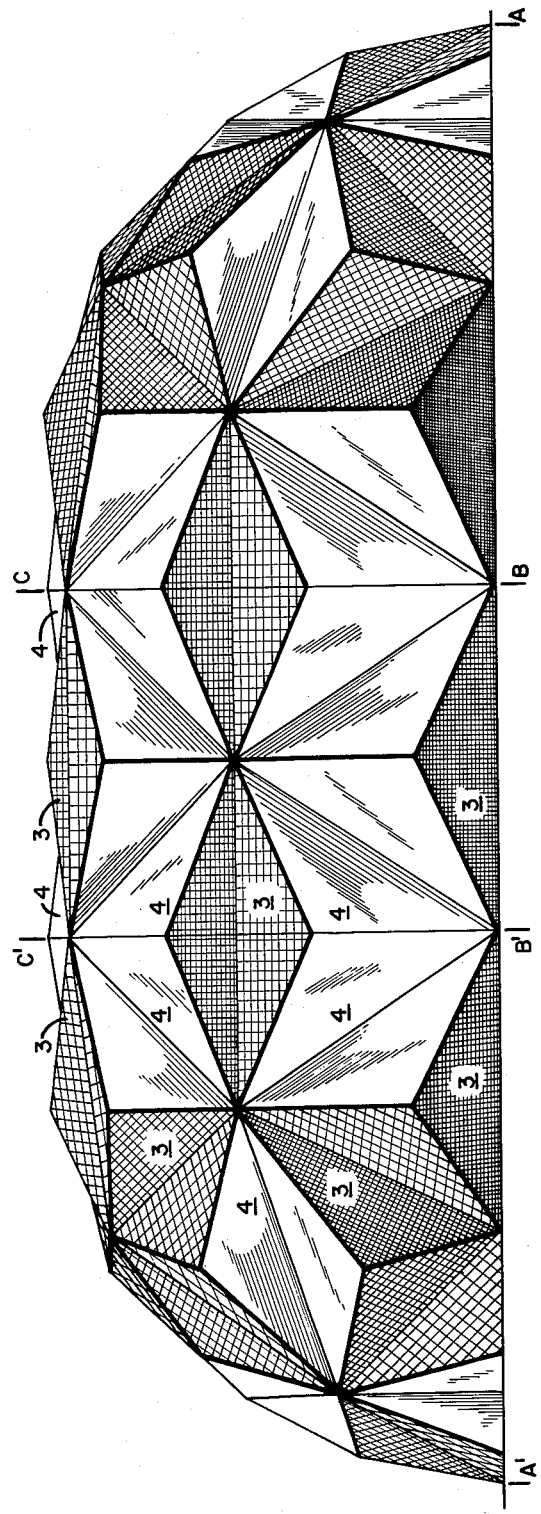

INVENTOR.
RICHARD BUCKMINSTER FULLER
BY
ATTORNEYS.

Aug. 31, 1965  R. B. FULLER  3,203,144
LAMINAR GEODESIC DOME
Filed May 27, 1960  14 Sheets-Sheet 9

INVENTOR.
RICHARD BUCKMINSTER FULLER
BY
ATTORNEYS.

Aug. 31, 1965    R. B. FULLER    3,203,144
LAMINAR GEODESIC DOME
Filed May 27, 1960    14 Sheets-Sheet 10

INVENTOR.
RICHARD BUCKMINSTER FULLER
BY
*Robertson & Smythe*
ATTORNEYS.

Aug. 31, 1965    R. B. FULLER    3,203,144
LAMINAR GEODESIC DOME
Filed May 27, 1960    14 Sheets-Sheet 11

INVENTOR.
RICHARD BUCKMINSTER FULLER
BY
ATTORNEYS.

INVENTOR.
RICHARD BUCKMINSTER FULLER
BY
ATTORNEYS.

Aug. 31, 1965　　　R. B. FULLER　　　3,203,144
LAMINAR GEODESIC DOME
Filed May 27, 1960　　　　　　　　　　14 Sheets-Sheet 13

INVENTOR.
RICHARD BUCKMINSTER FULLER
BY
ATTORNEYS.

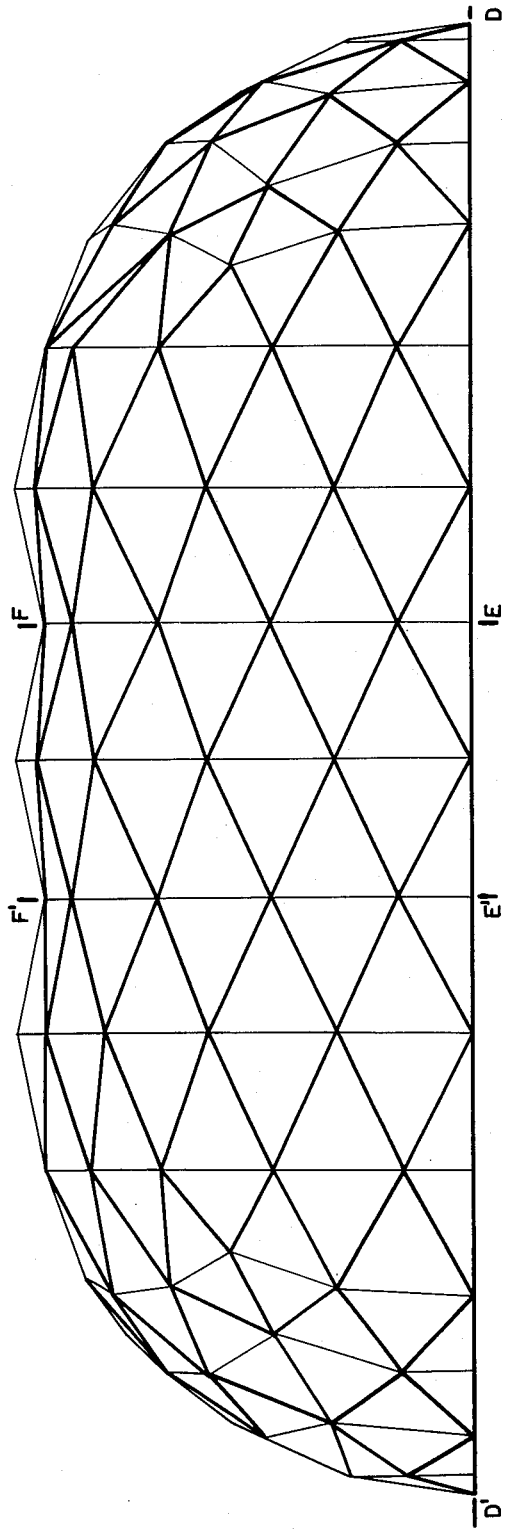

__United States Patent Office__

3,203,144
Patented Aug. 31, 1965

3,203,144
LAMINAR GEODESIC DOME
Richard Buckminster Fuller, 407 S. Forest St.,
Carbondale, Ill.
Filed May 27, 1960, Ser. No. 32,268
2 Claims. (Cl. 52—81)

The invention relates to improvements in geodesic dome construction, particularly with reference to the fabrication of extremely light-weight domes made of paperboard or plastic laminar parts comprising thin inner and outer facing sheets fastened to, and spaced by, a core of strong feather-light material such as expanded polystyrene.

When such laminar parts are arranged in over-lapping fashion and held together by adhesive means, the stresses between two adjoining parts must be transmitted through those faces thereof which are in direct adherence to one another. The one part will have an overlying lap, the other an underlying lap, so that stress transfer is from the *inner* facing sheet of the one part to the *outer* facing sheet of the other. The effect of this is to place the laminae in shear. This shear loading will be transmitted to the core material of the composite laminae and through it to the opposite facing sheets, whereas the edges of these opposite facing sheets, i.e. the edges which lie opposite the adhered laps, cannot be utilized for direct transmission of the stresses. It is noted that this problem is peculiar to structures comprised of that particular type of overlapping panels which have inner and outer facing sheets with a spacing core between them. I have discovered how to weave together the inner and outer facing sheets of alternate panels of such a type in a strengthening pattern which is characterized by an improved continuity of both the inner and outer sheets extending substantially throughout the structure of the dome. A part of my discovery in this respect may be briefly summarized as follows:

SUMMARY

In a geodesic dome comprised of diamond panels arranged in overlapping relation to one another and having inner and outer sheets and spacing means between these sheets, the diamond panels will be assembled so that their overlaps are symmetrically arranged in oppositely disposed pairs. Thus a single panel will have one pair of opposed overlying laps and one pair of opposed underlying laps. The overlapping portions of the panels are adhesively secured together with the inner sheet of one panel adhered to the outer sheets of a pair of adjacent panels and the outer sheet of the one panel adhered to the inner sheets of another pair of adjacent panels. This creates a "weave" of the inner and outer facing sheets which may be likened to the warp and woof of a woven fabric, and this woven pattern creates a continuity in the shear-connected inner and outer facing sheets. In this fashion each composite diamond panel will have an outer face carrying stresses along one continuous path, or direction, and an inner face carrying stresses along another continuous path, or direction. These stress-carrying paths are so interrelated in the overall pattern that the tensile strength of both facing sheets can be utilized to fuller advantage than has heretofore been disclosed in a laminar geodesic structure.

I have discovered further how to obtain such a continuous woven stress pattern in a structure wherein opposed laps at the upper ends of the diamonds are underlying laps whereas those at the lower ends of the diamonds are overlying laps so that the construction is inherently shingled to shed water while affording the stress continuity of the woven inner and outer sheets of the panels.

Other advantages are obtained by utilizing panels of the foregoing composite type comprised of flat sheets which in their assembled relationship exhibit an overall pattern of planar triangular facets which are paired in diamond-shaped sections, the triangular facets of a plurality of pairs being arranged at an angle to one another to form diamond-shaped sections bent into outward concavity about the long axis of the diamond and presenting trough-shaped depressions in the outer surface of the dome. The triangular facets of other pairs of facets are arranged at an angle to one another to form diamond-shaped sections bent into outward convexity about the short axis of the diamond and present ridges alternating with the trough-shaped depressions in the outer surface of the dome whereby said outer surface is faceted with intersecting ridges and valleys which stiffen the panel structure of the dome.

These and other advantages of my invention will appear more fully from the ensuing description of the best mode contemplated by me for carrying out my invention.

DESCRIPTION

In the drawings:

FIG. 1 is a diagrammatic view of a sphere upon which is shown the spherical icosahedron and the arrangement of the panels upon one of the faces of the spherical icosahedron. The arrangement disclosed is based upon a breakdown of the triangular faces of the icosahedron which is known to those familiar with the art of geodesic dome construction as a "three-frequency" breakdown, by reason of the fact that the sides of the icosahedron triangles are divided into three segments, or modules. "Frequency" is further described in my fundamental geodesic construction Patent No. 2,682,235.

FIG. 16 is a side elevational view of a structure comprising ⅝ spherical ends, each comprising one-half of the ⅝ sphere of FIG. 12 and a center section comprising two spherical segments duplicating a segment truncated, and extending between, the lines of truncation designated "⅜" and "⅝" in FIG. 12.

FIG. 17b is a schematic exploded view, in perspective, of a particular grouping of panels within a structure similar to that shown in FIG. 17a.

FIG. 26 is a side elevational view of an elongated structure having ⅝ spherical ends, each comprised of one-half of the structure shown in FIG. 25, and a center section comprising two spherical segments duplicating a segment truncated, and extending between, the lines of truncation designated "⅜" and "⅝" in FIG. 25.

*Geodesic construction adapted to be truncated*

Figure 1:
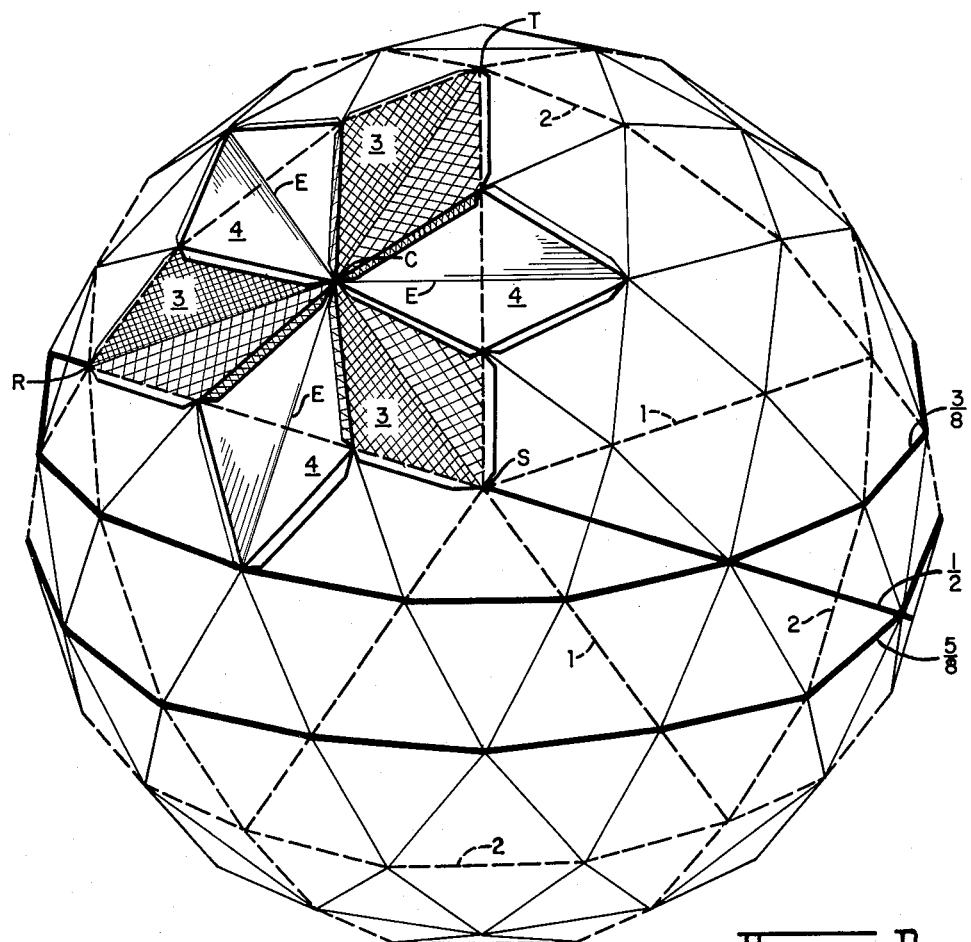

In FIG. 1 the dotted lines 1 represent a spherical icosahedron comprising twenty equilateral spherical triangles, the sides of which are all great circles of the sphere. If we consider point S as the zenith, the five spherical triangles whose apexes come together at the zenith are sometimes referred to by persons skilled in the art of geodesic construction as the "isosacap." The five great circle lines radiating from S may be read either as the edges of the spherical triangles, i.e. the intersections with a sphere of planes passing through the center thereof and containing the point S, or as chords or chordal modules of such great circle interesections. The dotted lines 2 forming the peripheral edges of the icosacap are shown in FIG. 1 as chordal modules of great circles. The structure of the spherical icosahedron is known in the art of geodesic structures and has been described in my Patent No. 2,682,235, granted June 29, 1954, in conjunction with a description of my 3-way grid, according to which each of the spherical triangles comprised in the spherical icosahedron is subdivided into substantially equilateral triangles or diamonds. According to one aspect of my present invention, the structuring of the 3-way grid is modified in a manner which provides for easy truncation of the sphere along lines at the edges of panels which will yield either a one-half sphere, a three-eighths sphere or a five-eighths sphere without in any way increasing the number of different kinds of panels used in the construction, a coplanar ground line being provided by edges of the diamond panels or half panels formed by dividing a panel in two on one or the other of its axes.

Particular attention is directed to the fact that the chordal modules of the lines of truncation designated "⅜" and "⅝" in FIG. 1, when viewed in one aspect, appear to be chordal modules of lesser circles. However, by construction upon the spherical icosahedron wherein all of the vertexes, and therefore both axes, of the diamond panels lie in great circle planes, these chordal modules in reality lie in planes passing through the center of the sphere whose intersections with the sphere describe great circle arcs. The phenomenon of alignment of panel edges for truncation may be described as the ancillary appearance of small circles, which may be likened to the parallels of latitude of a standard globe of the earth, at the three-eighths and five-eighths lines of truncation occurring, however, as incidents of true great circle, i.e. geodesic, construction.

Figure 2:
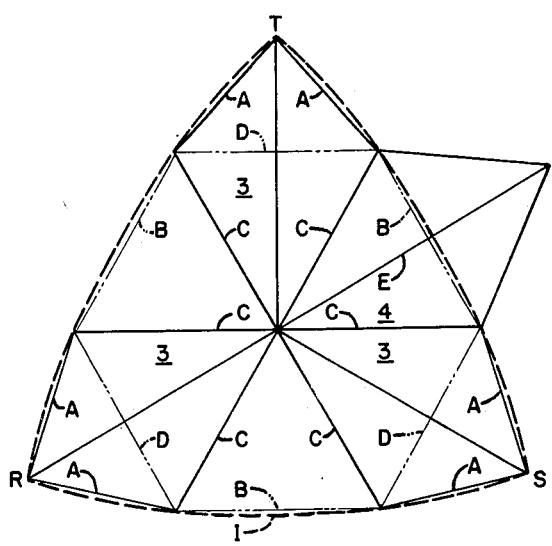
FIG. 2 is a diagram covering approximately the area of the panels in FIG. 1.

With reference to FIG. 2, I shall now describe how to obtain, in a 3-frequency breakdown, the particular 3-way grid pattern which will yield the several planes for truncation as above described and which will produce remarkable simplicity of componentation in that the entire structure may be assembled from only two kinds of parts. This view is a diagram of one of the spherical icosahedron triangles RST corresponding to triangle RST in FIG. 1. The spherical triangle is shown in dotted lines. Superimposed upon the edges of the spherical triangle are chordal modules thereof designated A and B. Chords C intersect the sphere at the center of the spherical triangle and at the points where the meeting ends of chords A and B intersect the sphere. Chords D intersect the sphere at the points of intersection of chords A, B and C. Chord E forms the major axis of that one of the diamond types whose minor axis lies in the great circle plane which contains one of the sides (ST) of the spherical triangle. In FIG. 1, $E=E=E$. Thus the six diamond panels which are comprised within the shaded area of FIG. 1 consist of two types, the one type, 3, being represented by the darker shading, the other type, 4, by the lighter.

Given the diameter of the sphere upon which the desired geodesic dome is to be constructed, the critical dimensions of the diamond panels are ascertained as follows for the chords as designated with reference to FIG. 2:

$A = 0.32968$
$B = 0.44112$
$C = 0.42154$
$D = 0.38216$
$E = 0.71364$

Multiply each of these factors by the radius of the desired dome expressed in whatever units may be desired, such as feet, inches, meters or centimeters. The product will give the lengths of the chords according to the units of measurements selected, thus providing the dimensions for the lengths of the sides of each of the two diamond types. In the case of the diamond whose major axis is shown at E in FIG. 2, the dimensions of the outer pair of sides derive from the lengths of the other chords as determined above.

*Panel construction*

Figure 3:
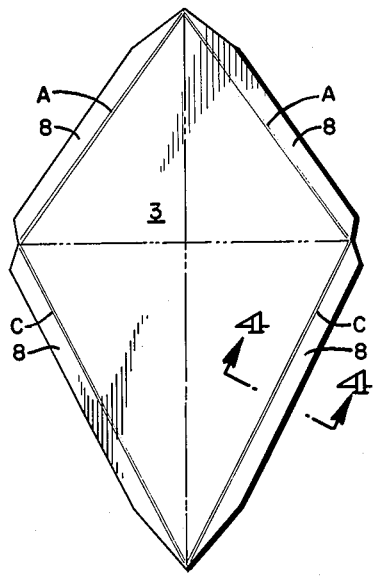
FIG. 3 is a face view of one of the panels shown in FIG. 1 before bending.
Figure 4:
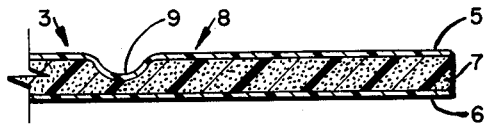
FIG. 4 is an enlarged cross-sectional detail taken on the line 4—4 of FIG. 3 across the score line for one of the flaps of the panel.
Figure 5:
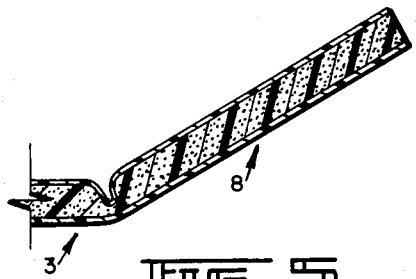
FIG. 5 is a view similar to FIG. 4 showing a flap bent at an angle such as it assumes when the panel is fastened to an adjacent panel of like construction.

FIGS. 3, 4 and 5 illustrate the construction of one of the panels of which type 3 is taken as representative. The panels comprise inner and outer sheets 5 and 6 and spacing means 7 between the sheets. The inner and outer facing sheets 5 and 6 may be made of any suitable material such as paperboard, metal foil, plastic, etc. The spacing material or core 7 preferably is made of some foam material such as expanded polystyrene, although other types of filling material may be employed, such as a corrugated sheet. A preferred composite sheet is one made of an expanded polystyrene core with liners or facing sheets of Kraft paper, a material sold under the trademark "Fomecor." The Kraft paper or paperboard may be waterproofed and strengthened by a plastic or other coating. Composites employing the expanded polystyrene cores have been found to possess exceptionally good characteristics for dome construction according to my present invention, affording laminae which are tough, stiff and almost feather-light. Each panel 3 (and 4) is of the general diamond form shown in FIG. 3 and has four extending flaps 8 along its margins providing means for attachment to adjacent panels. The panels may be scored as at 9, FIG. 4, along the lines of the chords A, C, etc., which define the edges of the panel proper and the lines of fold of the flaps 8. Each panel may also be scored along either the major or minor axis of the diamond, as indicated by the dot-dash lines in FIG. 3. Thus, in FIG. 1, each of the panels 4 is scored and bent about its long axis which represents the chord E previously referred to, this fold being in the direction to produce an outward concavity in the surface of the dome. (In FIG. 1 all of the panels shown are bent into outward concavity about their long axes.)

Figure 6:
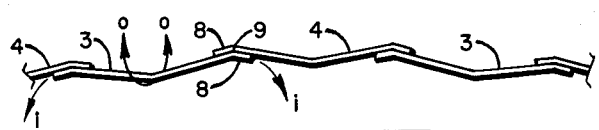
FIG. 6 is a diagrammatic cross-sectional view extending through a series of connected panels.

FIG. 6 shows a series of connected panels of this configuration. The score lines 9 of adjacent panels are arranged in juxtaposition, affording a double thickness of the panel structure at the bend of the joint between them. The panels are adhesively secured together. I have found that a contact type adhesive such as a neoprene base adhesive is well suited for this construction.

*Tetrahedral panels*

Figure 8A:
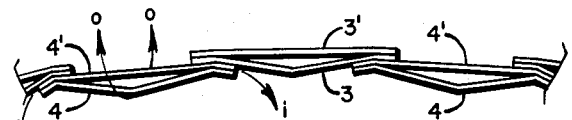
FIGS. 8a and 8b are diagrammatic cross-sectional views extending across a series of connected double panels of the type shown in FIG. 7.
Figure 7:
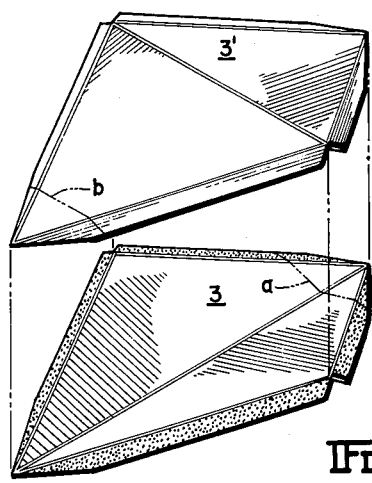
FIG. 7 is an exploded view of a double panel comprising an outer panel bent into outward convexity about its short axis and an inner panel bent into inward convexity about its long axis.
Figure 8B:
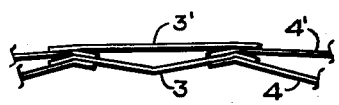

Some or all of the panels may be comprised of two sheets 3 and 3', FIG. 7, sheet 3 being bent into inward convexity about its long axis and sheet 3' being bent into outward convexity about its short axis as shown. The flaps of the two panels are adhesively secured together. This results in a hollow panel having four faces and six edges, an irregular tetrahedron which is very strong and stiff and furnishes insulation against heat and cold. The outer panel 3' may have its lower end cut off at the line *b*, and the inner panel have its upper end cut off at the line *a*, furnishing weatherproof ventilation for the structure. FIGS. 8a and 8b show a series of connected double panels of the form shown in FIG. 7 except that some of the panels will be of the general type 3 and others of the general type 4, having reference to the preceding description of these general types. When the double panels are made by connecting the individual panels in alternating sequence, e.g., panel 3' to panel 4' to panel 3 to panel 4, as shown in FIG. 8b, a particularly strong interlaced construction is afforded.

*"Inner" and "outer" panels*

Figure 9:
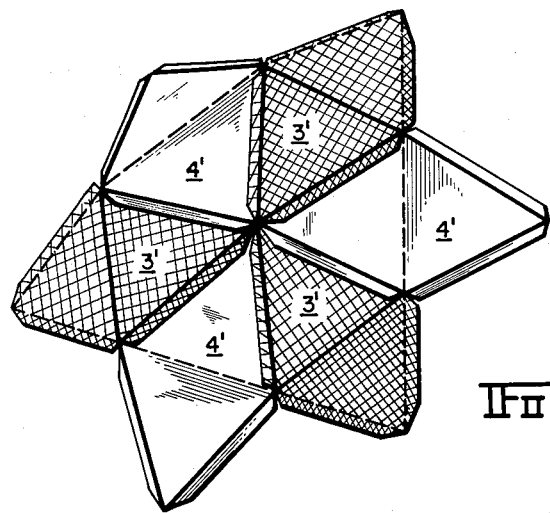
FIG. 9 is a perspective view of six inter-connected panels, each of which is bent into outward convexity about its short axis.
Figure 10:
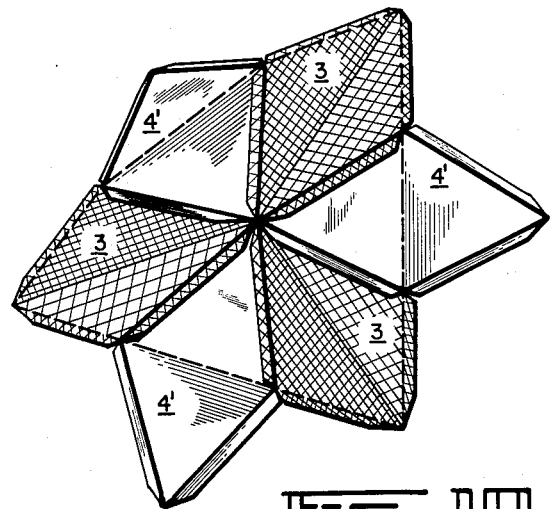
FIG. 10 is a similar view in which three of the panels are bent into outward concavity about their long axis.
Figure 11:
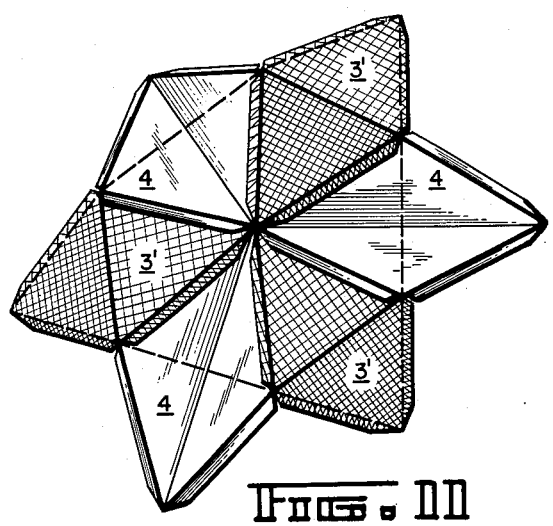
FIG. 11 is a similar view of another arrangement of three convex and three concave panels.

FIGS. 9, 10 and 11 illustrate several different arrangements of the type 3 and type 4 panels, some of such panels being bent about the short axis and others about the long axis. Thus FIG. 9 shows a group of panels 3' and 4' all bent into outwardly convex form. In FIG. 10 some of the panels, namely those designated 3, are bent into outward concavity about their long axes. In the arrangement of FIG. 11, the outwardly concave panels 3 of the FIG. 10 construction are replaced by outwardly convex panels 3', whereas the outwardly convex panels 4' of FIG. 10 are replaced by outwardly concave panels 4, showing the complete interchangeability of the concave and convex forms. Also, it may be considered that the construction shown in each of FIGS. 9, 10 and 11 may comprise double panels of the form exemplified in FIG. 7. For simplicity of description, if we call the outwardly convex panels "outers," the outwardly concave panels "inners," and the combination of these two forms as "doubles," this aspect of my invention may be summarized as including all of the following possible combinations:

(1) all "inners"
(2) all "outers"
(3) all "doubles" (inners and outers)
(4) part "inners," part "outers"
(5) part "inners," part "doubles"
(6) part "outers," part "doubles"
(7) part "inners," part "outers," part "doubles"

*Elongated geodesic domes (Part I)*

Figure 12:
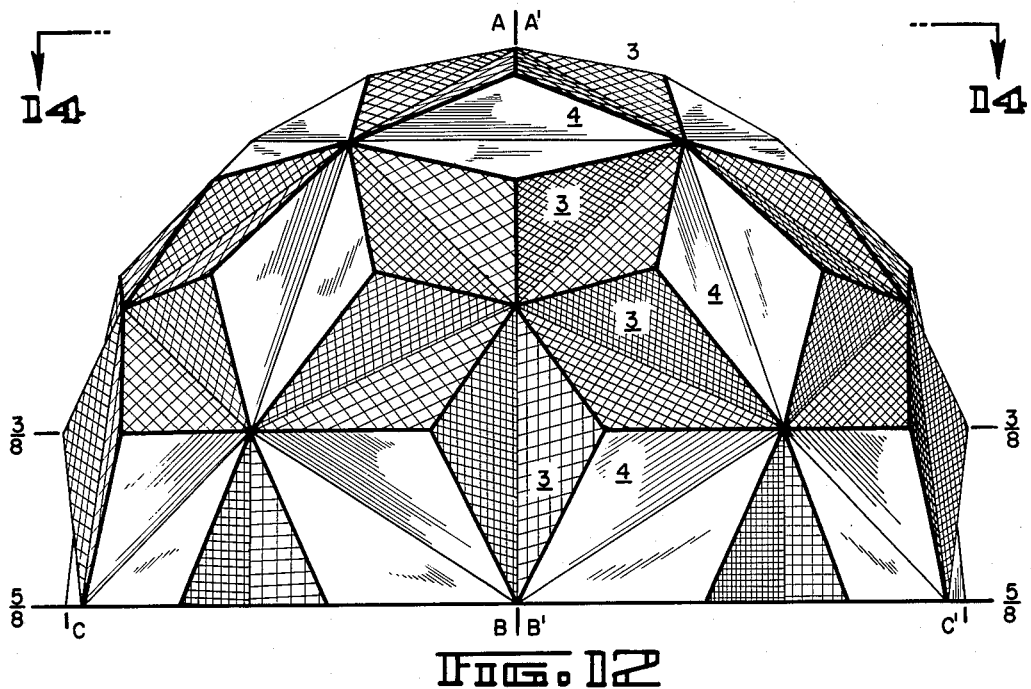
FIG. 12 is a side elevational view of a ⅝ sphere constructed in accordance with the panel arrangement depicted in FIG. 1 in which all of the panels are bent into outward concavity about their long axes.
Figure 14:
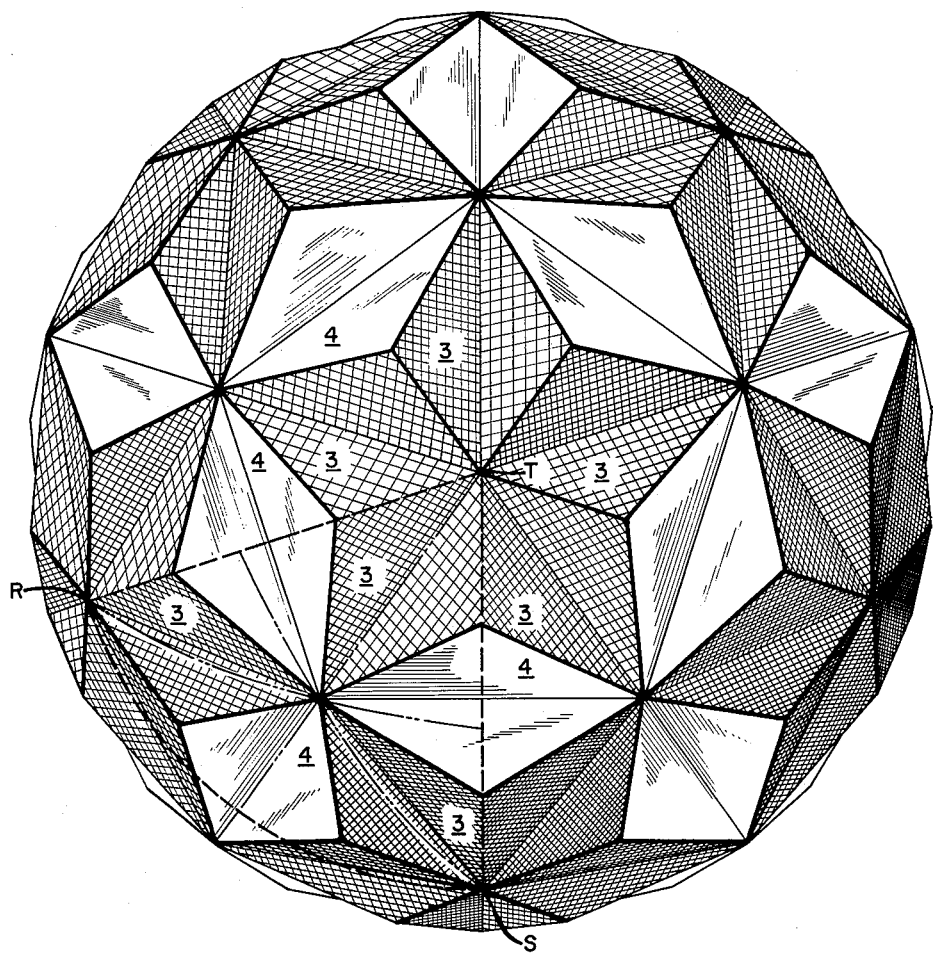
FIG. 14 is a plan view of the FIG. 12 structure taken as indicated at 14—14 therein.

In FIGS. 12 and 14, we see a completed five-eighth sphere constructed in the manner I have described with reference to FIGS. 1–5 inclusive.

Figure 13:
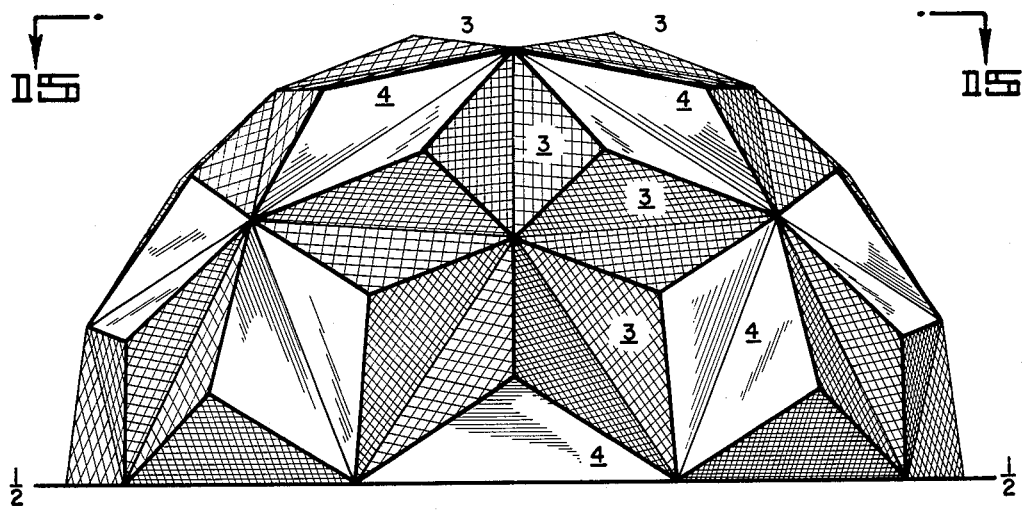
FIG. 13 is a side elevational view of a ½ sphere having the identical panel construction of FIG. 12 but with the line of truncation for the base occurring as shown in FIG. 1 at the line designated "½."
Figure 15:
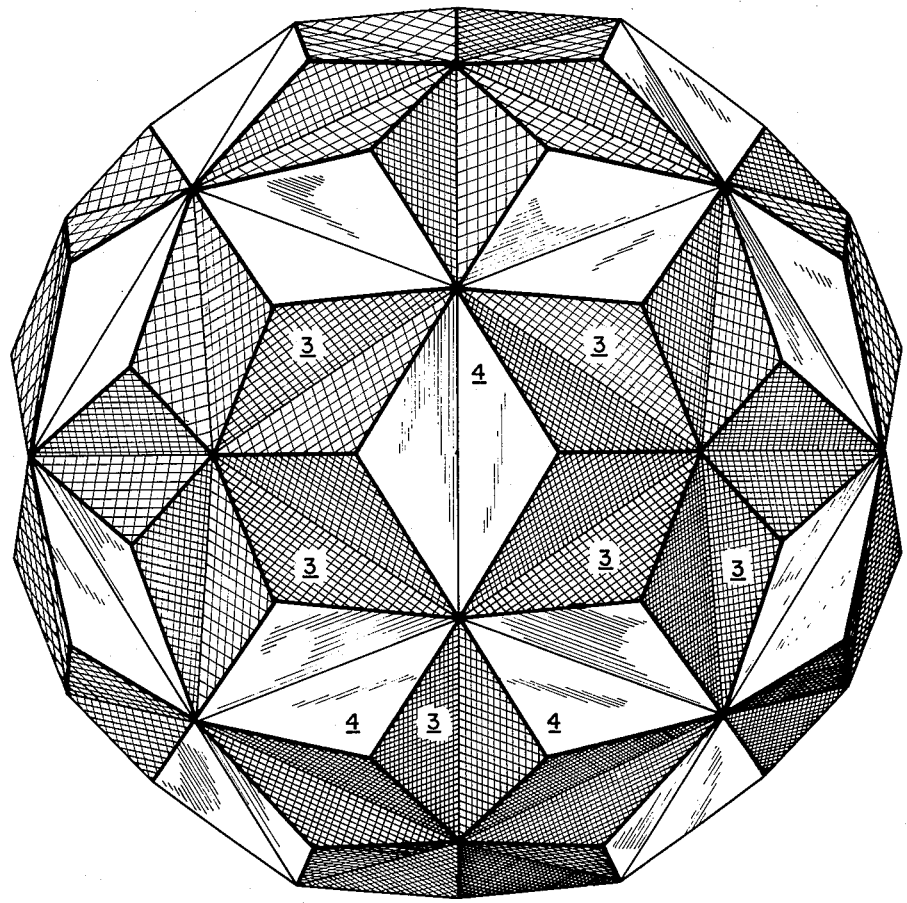
FIG. 15 is a plan view of the FIG. 13 structure taken as indicated at 15—15 therein.

FIGS. 13 and 15 represent the same construction as applied to a one-half sphere truncated as shown at the line designated "½" in FIG. 1.

If we take the structure shown in FIG. 12 and divide it in two along the line designated A–B (or A'–B'), another aspect of the invention is revealed. This produces two half sections of a five-eighth sphere, ABC and A'B'C'. In FIG. 16 we see one of these sections ABC at the right and the other, A'B'C', at the left, the one having been rotated 90° clockwise from the position shown in FIG. 12 and the other 90° counterclockwise. Between the planes BC and B'C' of FIG. 16, we have a center section BB'C'C comprising two spherical segments duplicating a segment truncated, and extending between, the lines of truncation designated "⅜" and "⅝" in FIG. 12. In the completed FIG. 16 dome, the center section gives an appearance of being generally cylindrical in form but from the discussion which has preceded, it will be understood that it is in reality comprised of two segments of a spherical geodesic dome. Thus I have discovered a way in which sphericity can in effect be extended or "stretched" to produce elongated geodesic domes. If desired, the center section BB'C'C may be omitted from the FIG. 16 construction and the end portions thereof be brought together with a coincidence of the planes BC and B'C', producing an elongated structure somewhat shorter than shown in this view of the drawing. Or as a further alternative, it is possible to use two or more of the sections BB'C'C to produce a tunneled geodesic structure of any desired length. Again, by removing the five-eighths sphere half section which lies to the left of plane B'C' of FIG. 16, and considering the plane B'C' as the base of the remaining structure we have one half of a silo-like structure which will mate with another structure of identical form along plane AB' to produce a tower having a five-eighths spherical top and generally cylindrical walls. These several constructions possess in common a generally cylindrical mid-section having the primary attributes of true geodesic construction in respect to its unique abilities for maximum utilization of the tensile properties of materials and the provision of a more favorable weight-strength ratio than has ever been attained with the use of conventional ideas in building construction.

*Weaving of panel overlaps*

Figure 17A:
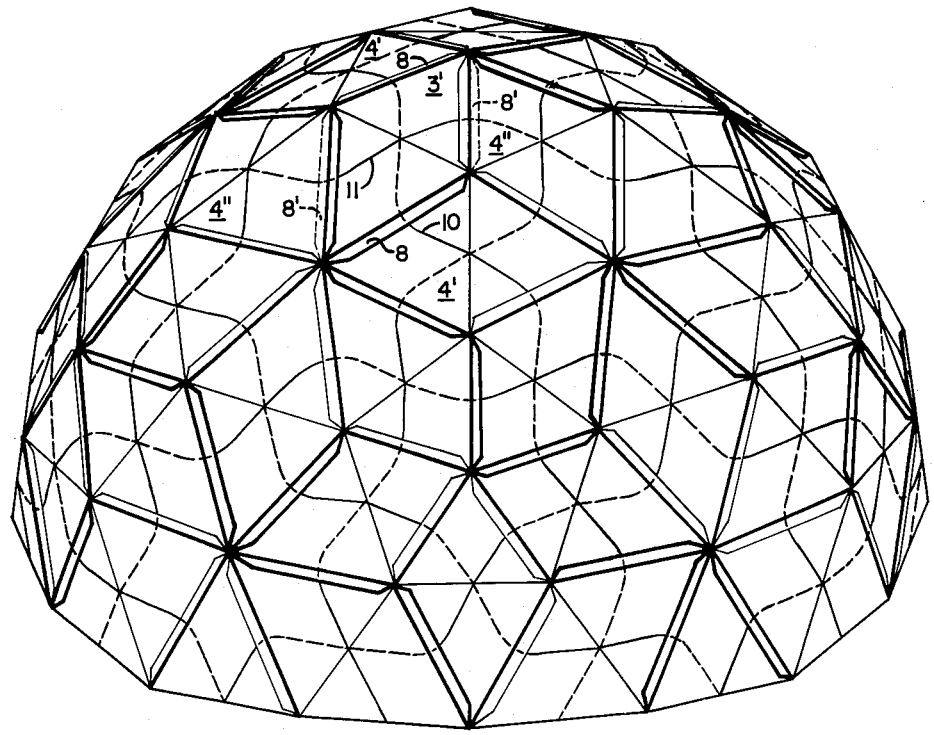
FIG. 17a is a ⅝ sphere incorporating the 3-frequency panel arrangement of FIG. 9 with a modified arrangement of the overlaps between the panels, and upon which is superimposed a diagrammatic representation of the continuous paths of stresses transmitted by the inner and outer facing sheets of the interlaced panels.
Figure 17B:
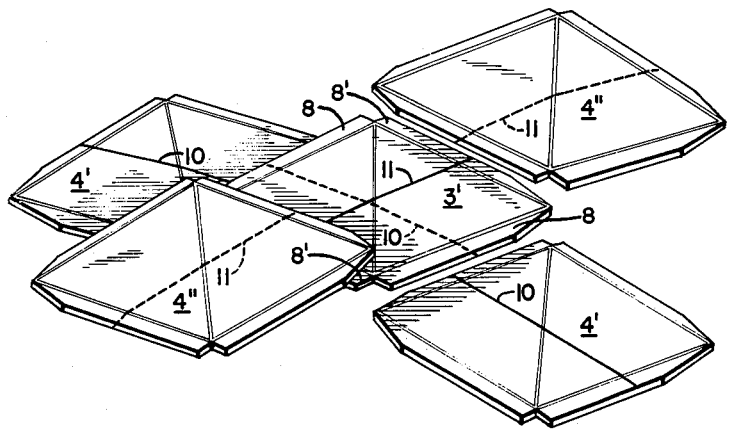

Again referring to FIG. 6, it will be observed that panels 3 have underlying laps whereas panel 4 has overlying laps. Hence stress transfer in the plane of the surface of the structure occurs between the inner facing sheet of panel 4 and the outer facing sheets of the adjoining panels 3. The effect of this is to place the panel laminae in shear, the shear loading being transmitted to the core material of the composite laminae and through it to the opposite facing sheets. The edges of these opposite facing sheets, i.e. the edges which lie opposite the adhered laps, cannot be utilized for direct transmission of the stresses. This problem is peculiar to structures comprised of that particular type of overlapping panels which have inner and outer facing sheets with a spacing core between them. This brings us to that aspect of my invention which concerns my discovery of how to weave together the inner and outer facing sheets of alternate panels in a strengthening pattern which is characterized by an improved continuity of both the inner and outer sheets extending substantially throughout the structure of the dome as will now be explained with reference to FIGS. 17a and 17b. Here the diamond panel laminae are assembled in such a way that their overlaps are symmetrically arranged in oppositely disposed pairs. Thus a single panel 3' will have one pair of opposed overlying laps 8 and one pair of opposed underlying laps 8'. The overlapping portions of the panels are adhesively secured together with the inner sheet of panel 3' adhered to the outer sheets of a pair of adjacent panels 4', and with the outer sheet of panel 3' adhered to the inner sheets of another pair of adjacent panels 4". Thus we have a direct transfer of stress between the inner sheet of panel 3' and the outer sheets of panels 4' along a path represented diagrammatically by the line 10 (FIG. 17b). Similarly there is a direct transfer of stresses from the outer sheet of panel 3' to the inner sheets of panels 4" as represented diagramatically by the line 11 showing a cross weave of the stress pattern. Stress paths 10 and 11 are made up of full lines wherever the stress is in the outer sheet of the pattern, by dotted lines where the stress is in the inner sheets. These paths of stress transfer create a "weave" of the stresses in the inner and outer facing sheets which may be likened to the warp and woof of a woven fabric, and this woven pattern produces a continuity in the shear-connected inner and outer facing sheets which extends substantially throughout the structure of the dome. The intersecting paths of stress themselves create a 3-way grid of stress lines, being so interrelated in the over-all pattern that the tensile strength of both facing sheets can be utilized most effectively in what appears to be a new synergy complementing the fundamental synergetic phenomenon which has come to be recognized by scientists and builders familiar with present day geodesic building construction and strategy.

Another advantage of the crisscross stress weaving patterns exemplified in FIGS. 17a, 17b and 23 may be explained with reference to FIG. 6 which shows how, with reference to a selected panel 3, the stresses in the inner sheets of two adjacent panels 4 create an inward pull at the overlapped edges of panel 3 as suggested by the arrows $i$, whereas the stresses in the outer sheets of two other adjacent panels (one above and one below the plane of the drawing and therefore not shown in FIG. 6, but compare the two sets of adjacent panels 4' and 4" in FIG. 17b) create an outward pull at the underlapped edges of panel 3 as suggested by the arrows $o$. The crisscrossed inward and outward pulls on a given panel exert compressive stresses in the core material 7 of the panel, and the combination of such inward and outward pulls has been found to have a constraining effect which tends to draw the edges of the panel toward one another so that the inner and outer facing sheets of the panel are somewhat constrained against peeling apart. Cf. also the arrows $i$ and $o$ in FIG. 8.

Figure 18:
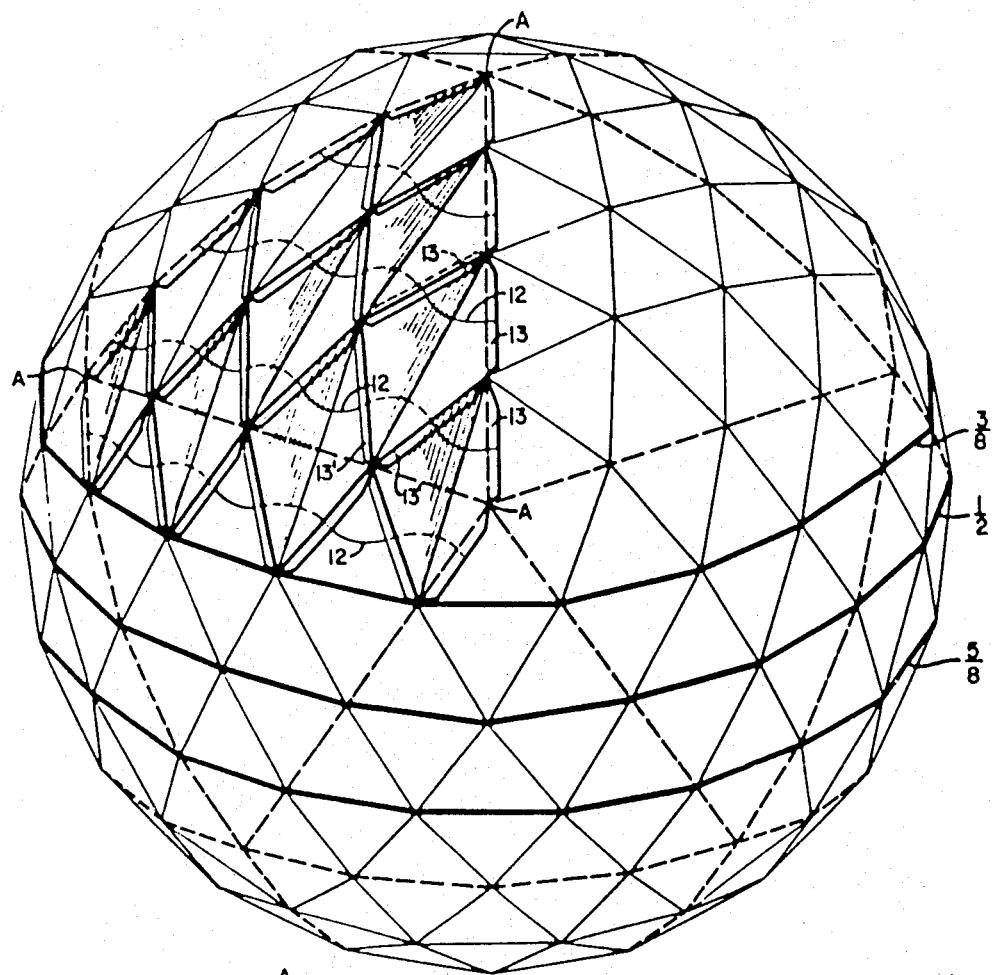
FIG. 18 is a diagrammatic view of a sphere truncatable alternately at a ⅜, ½ and ⅝ sphere showing a 4-frequency arrangement of panels of the type which is bent into outward concavity about its long axis.

In FIG. 18 I have disclosed how to obtain a continuous woven stress pattern in a structure wherein opposed laps at the upper ends of the diamonds are underlying laps, whereas those at the lower ends of the diamonds are overlying laps so that the construction is inherently shingled to shed water while affording the stress continuity of the inner and outer woven sheets of the panels. The paths of the continuous lines of stress are indicated diagrammatically by the several lines 12. Here we have a pair of opposed underlying laps 13 and a pair of opposed overlying laps 13'.

Figure 20:
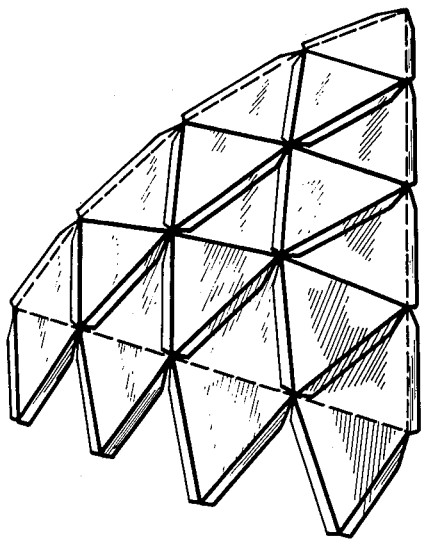
FIG. 20 is a perspective view of panels similar to those shown in FIG. 18 except that they are of the type which is bent into outward convexity about the short axis.

In the FIG. 18 construction, the panels are all bent into outward concavity about their long axes. In FIG. 20 the same weaving of stress patterns in a shingled construction is obtained with the use of a panels bent into outward convexity about their short axes, i.e. the panels are all "outers," to use the short terminology heretofore adopted.

Figure 21:
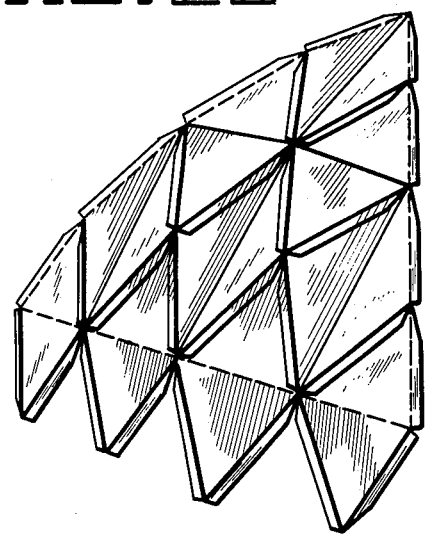
FIG. 21 is a similar view showing a combination of outwardly convex and concave panels.

FIG. 21 utilizes the same stress weaving pattern and shingling in a construction comprising a combination of outers and inners.

Figure 22:
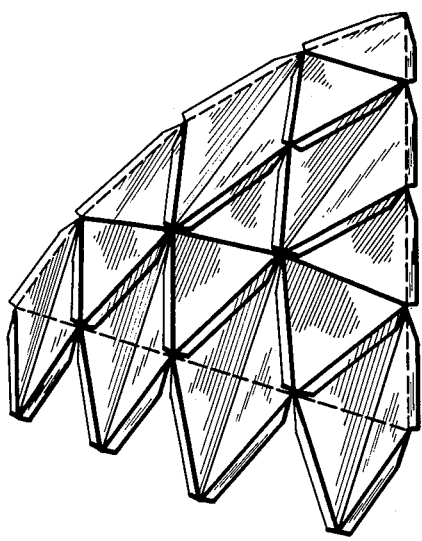
FIG. 22 is a similar view showing another combination of outwardly convex and concave panels.

FIG. 22 illustrates a different combination of the outers and inners. As in the discussion which has preceded, it will be understood that wherever outers are depicted, the drawing may be read as illustrating either outers or a combination of outers and inners ("doubles"), referring to the double panel construction described with reference to FIG. 7.

Figure 23:
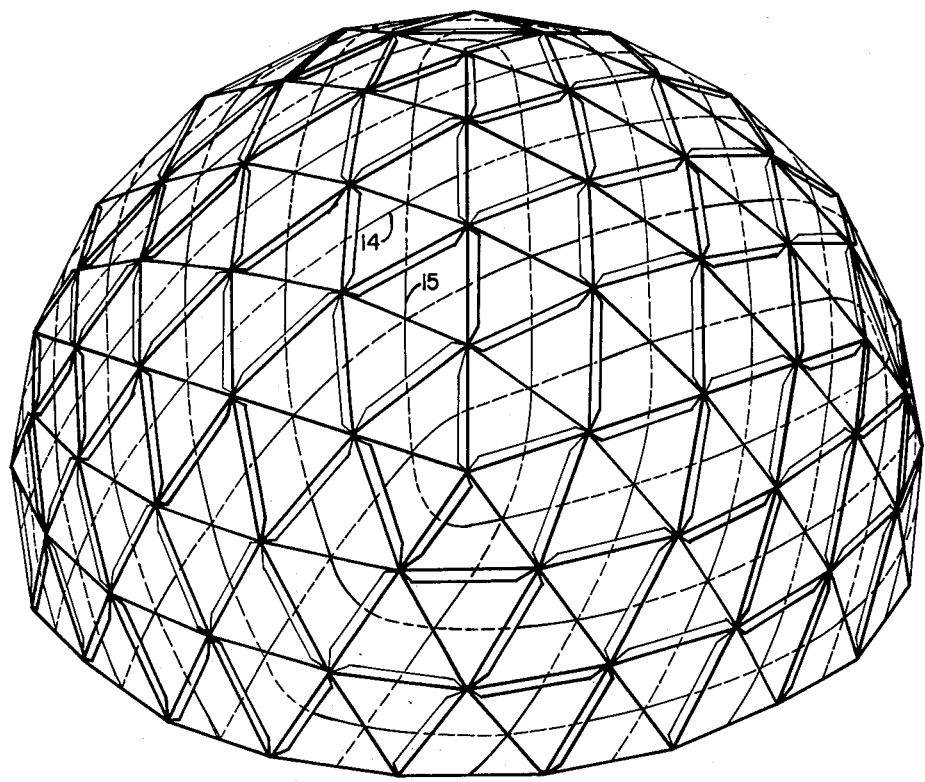
FIG. 23 is a perspective view of a ⅝ 4-frequency sphere showing a modified overlapping arrangement of the panels.

FIG. 23 illustrates a still further modifiaction of the arrangement of the panels and their overlaps. As before, a single panel has one pair of opposed overlying laps and one pair of underlying laps. The paths of direct transfer of skin stresses are shown diagrammatically by the lines 14 and 15 interlaced in a continuous woven pattern.

Recapitulating with respect to FIGS. 17 to 23 inclusive, it may be stated that FIG. 17 typifies a stress weaving pattern in a 3-frequency dome whereas FIGS. 18 to 23 inclusive exemplify stress weaving patterns in a 4-frequency dome. (See the explanation of "frequency" as given hereinabove.) The 4-frequency dome possesses the inherent lines of truncation which have been described with reference to the 3-frequency dome as denoted in FIG. 18 by the lines of truncation designated "⅜," "½" and "⅝." It will be observed that in FIG. 1 the line of truncation for a one-half sphere is at an angle to the lines of truncation for the three-eighth and five-eighth spheres whereas in FIG. 18 all three lines of truncation occur in parallel planes.

Figure 19:
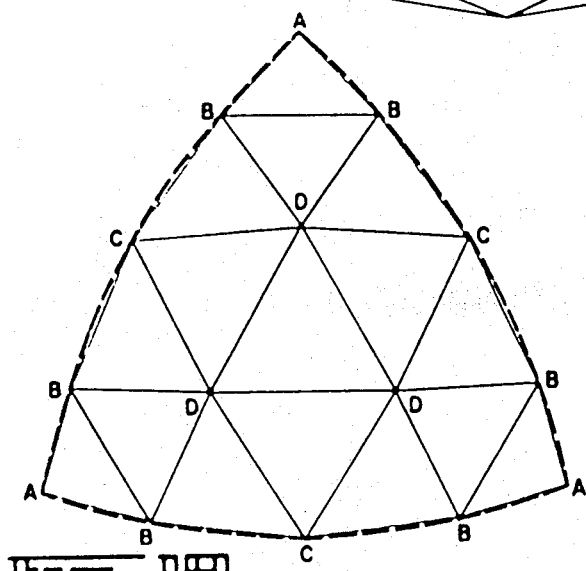
FIG. 19 is a diagram covering approximately the area of the panels in FIG. 18.

FIG. 19 shows the breakdown for the particular 3-way grid employed in the 4-frequency dome. This view is a diagram of one of the spherical icosahedron triangles AAA corresponding to triangle AAA in FIG. 18. As before, the spherical triangle is shown in dotted lines. Superimposed upon the edges of the spherical triangle are chordal modules thereof designated AB, BC, CD, etc. Given the diameter of the sphere upon which the desired geodesic dome is to be constructed, the critical dimensions of the diamond panels are ascertained as follows for the chords as designated with reference to FIG. 19:

$$AB = 0.22019$$
$$BB = 0.25958$$
$$BC = 0.32942$$
$$BD = 0.30907$$
$$CD = 0.31287$$
$$DD = 0.32492$$

Multiply each of these factors by the radius of the desired dome in whatever units may be desired, such as feet, inches, meters or centimeters. The product will give the lengths of the chords according to the units of measurement selected, thus providing the dimensions for the lengths of the sides of each of the diamond types. Truncation may be obtained in domes in which the 3-way grids of the icosahedron triangles are constructed at frequencies of 2, 3, or 4, or multiples thereof, for example frequencies of 6 and 12. It will be remembered that frequency has been defined as the number of modules into which each side of an icosa triangle is divided in laying out the 3-way grid pattern. In these patterns all of the points of the diamonds lie in great circles. It follows that all of the center lines of the diamonds, i.e. the long and short axes, are chords of great circles. Consequently all of the domes which I have described possess, in addition to the special advantages herein described, the fundamental advantages of true geodesic or great circle construction.

*Elongated geodesic domes (Part II)*

Figure 24:
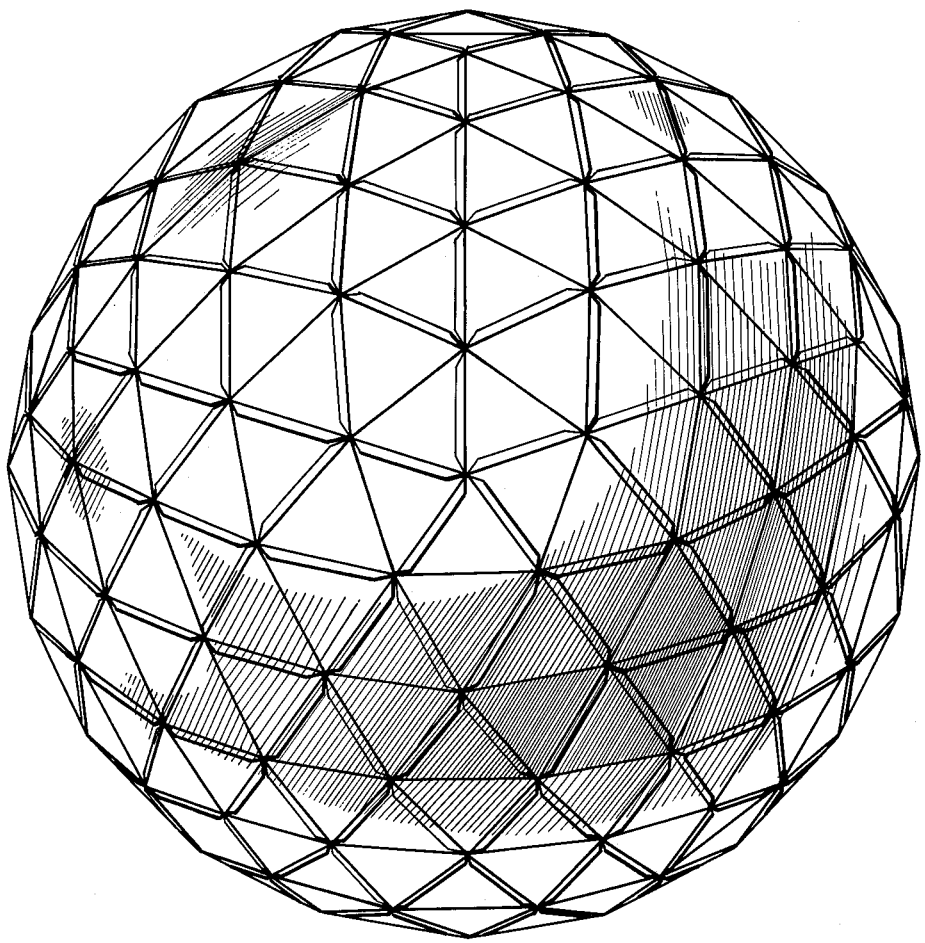
FIG. 24 is a plan view of the ⅝ 4-frequency sphere of FIG. 25 taken as shown at 24—24 in that view.
Figure 25:
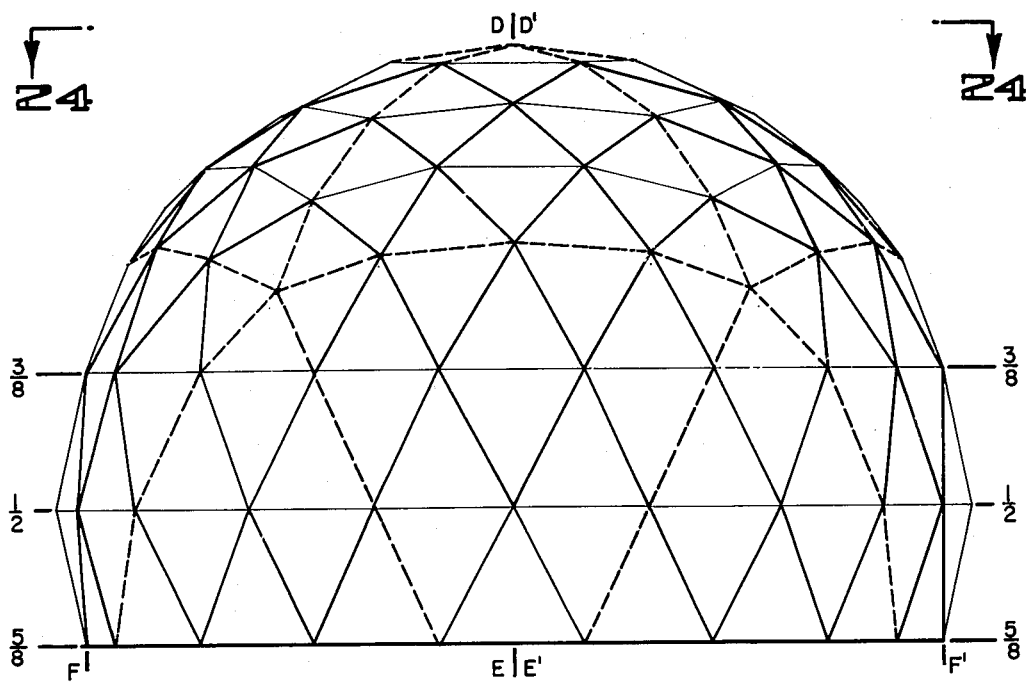
FIG. 25 is a side elevational view of the ⅝ sphere of FIG. 24.

In a 4-frequency dome constructed in the manner which has been described, and pursuing the panel arrangement disclosed in FIG. 24 as a plan of the five-eighth 4-frequency sphere of FIG. 25 taken as shown at 24—24 in that view, and with that orientation in which the center of the icosacap is the zenith, we obtain a modified form of the truncation segment which extends between the ⅜ and ⅝ lines of truncation. This in turn produces a modified form of the elongated structure heretofore described with reference to FIGS. 12 and 16. In this case, if we take the structure shown in FIG. 25 and divide it in two along the line designated DE (or D'E'), this produces two half sections of a five-eighth sphere DEF and D'E'F'.

In FIG. 26 we see one of these sections DEF at the right and the other D'E'F' at the left, the one having been rotated 90° clockwise from the position shown in FIG. 25, and the other 90° counterclockwise. Between the planes EF and E'F' of FIG. 26, we have a center section EE'F'F comprising two spherical segments duplicating a segment truncated, and extending between, the lines of truncation designated "⅜" and "⅝" in FIG. 25. In the completed FIG. 26 dome, the center section gives an appearance of being generally cylindrical in form but as has been explained with reference to FIG. 16, it will be understood that it is in reality comprised of two segments of a spherical geodesic dome. The mid-section of the FIG. 26 construction, in contradistinction to that shown in FIG. 16, is made up entirely of "outer" diamond panels bent about their short axes and half sections of "inner" diamond panels truncated at their short axes. This results in circumferential corrugations as will be readily apparent from an examination of FIG. 26. If desired, the center section EE'F'F may be omitted from the FIG. 26 construction and the end portions thereof brought together with a coincidence of the planes EF and E'F', producing an elongated structure somewhat shorter than shown. Or as a further alternative it is possible to use two or more of the sections EE'F'F to produce a tunneled geodesic structure of any desired length. Again, as was explained with reference to FIG. 16, these several constructions possess in common a generally cylindrical mid-section having the primary attributes of true geodesic construction.

As an example of the exceedingly favorable weight-strength ratio obtainable with my peculiar form of laminar construction, I may cite a dome made of "Fomecor" comprised of Kraft paperboard facing sheets upon expanded polystyrene core material having a composite thickness of one quarter in., utilizing single panels in a geodesic structure 19' in diameter and having the following specifications:

| | |
|---|---|
| Configuration | ⅝ sphere. |
| Head room use | 98%. |
| Covered floor area | 275 square feet. |
| Shelter volume | 2150 cubic feet. |
| Weight (including accessories) | 175 pounds. |
| Volume of components as packaged for shipment | 25 cubic feet (a package 4' square and 1'6" thick). |
| Weight per unit covered floor area | 0.636 pounds per sq. foot. |

When my invention is applied to larger sizes of domes, the weight of the dome per square foot of covered floor area can be decreased still further due in large measure to the form and arrangement of the overlapping composite panels in which the inner and outer facing sheets of alternate panels are woven together in a strengthening pattern which complements the inherent strength of geodesic 3-way grid construction.

The terms and expressions which I have employed are used in a descriptive and not a limiting sense, and I have no intention of excluding such equivalents of the invention described as fall within the scope of the claims.

I claim:
1. A geodesic dome comprised of panels arranged in overlapping relation to one another, said panels having inner and outer sheets and spacing means between said inner and outer sheets, said panels in their assembled relationship exhibiting an overall pattern of planar triangular facets which are paired in diamond-shaped sections, six diamond sections grouped together with the vertexes of the acute angles at one end of the long axis of each meeting at a common point, three of the six sections of the group having the following chord factors:

Sides adjacent said acute angles=0.42
Remaining sides=0.33
Short axis of diamond=0.38 and the other three of said six sections of the group being alternated with the first three sections and having the following chord factors:

Sides adjacent said acute angles=0.42
Short axis of diamond=0.44
Long axis of diamond=0.71 by virtue of which the dome comprises only two types of diamond sections and the edges of the panels are aligned along parallel lines defining a three-eighths sphere, one-half sphere and five-eighths sphere each terminating in a base plane defined by the aforesaid aligned edges of the panels.

2. A geodesic dome comprised of panels arranged in overlapping relation one to another, said panels having inner and outer sheets and spacing means between said inner and outer sheets, said panels in their assembled relationship exhibiting an overall pattern of planar triangular facets which are paired in diamond-shaped sections grouped in geodesic alignment, i.e. with edges of diamond sections lying substantially in planes containing the center of a sphere and whose intersections with said sphere define a spherical icosahedron and with other edges of the diamond sections lying substantially in planes containing the center of said sphere and whose intersections therewith define great circle arcs intersecting one another in a three-way grid pattern, the chord factors of the edges of the triangular faces of the icosahedron and grid being as follows:

(1) Chords adjacent the vertexes of the icosahedron=0.220
(2) Chords aligned with and intermediate the first-named chords=0.329
(3) Chords connecting the ends of chords (1)=0.260
(4) Chords having common intersections with chords (1) and (3)=0.309
(5) Chords intersecting adjoining ends of intermediate chords (2)=0.313
(6) Remaining chords=0.325 by virtue of which the edges of the panels are aligned along parallel lines defining a three-eighths sphere, one-half sphere and five-eighths sphere each terminating in a base plane defined by the aforesaid aligned edges of the panels.

References Cited by the Examiner

UNITED STATES PATENTS

| | | | |
|---|---|---|---|
| 1,469,041 | 9/23 | Guy | 50—226 |
| 2,682,235 | 6/54 | Fuller | 20—213 |
| 2,716,993 | 9/55 | Cordick | 50—52 X |
| 2,905,113 | 9/59 | Fuller | 50—52 |
| 2,918,992 | 12/59 | Gelsavage | 50—52 |
| 3,026,651 | 3/62 | Richter | 50—52 |

FOREIGN PATENTS 1,184,932   2/59   France.

OTHER REFERENCES

Architectural Forum, January 1957, p. 136.
Popular Mechanics, April 1957, pp. 126 and 127.

RICHARD W. COOKE, JR., *Primary Examiner.*

JACOB L. NACKENOFF, CORNELIUS D. ANGEL, JOEL REZNEK, *Examiners.*